United States Patent
Temam et al.

(10) Patent No.: US 11,099,772 B2
(45) Date of Patent: *Aug. 24, 2021

(54) HARDWARE DOUBLE BUFFERING USING A SPECIAL PURPOSE COMPUTATIONAL UNIT

(71) Applicant: Google LLC, Mountain View, CA (US)

(72) Inventors: Olivier Temam, Antony (FR); Harshit Khaitan, San Jose, CA (US); Ravi Narayanaswami, San Jose, CA (US); Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,385

(22) Filed: Dec. 2, 2019

(65) Prior Publication Data

US 2020/0183612 A1    Jun. 11, 2020

Related U.S. Application Data

(63) Continuation of application No. 16/240,459, filed on Jan. 4, 2019, now Pat. No. 10,496,326, which is a
(Continued)

(51) Int. Cl.
*G06F 3/06* (2006.01)
*G06N 3/04* (2006.01)
(Continued)

(52) U.S. Cl.
CPC ............ *G06F 3/0656* (2013.01); *G06F 3/061* (2013.01); *G06F 3/0683* (2013.01); *G06F 5/08* (2013.01);
(Continued)

(58) Field of Classification Search
CPC ...... G06F 3/0656; G06F 3/061; G06F 3/0683; G06F 12/0207; G06F 12/0215
See application file for complete search history.

(56) References Cited

U.S. PATENT DOCUMENTS

| 4,910,683 A | 3/1990 | Bishop |
| 5,163,132 A | 11/1992 | DuLac |

(Continued)

FOREIGN PATENT DOCUMENTS

| EP | 1367493 | 12/2003 |
| JP | 2002-182925 | 6/2002 |
| JP | 2006-301724 | 11/2006 |

OTHER PUBLICATIONS

TW Office Action in Taiwan Application No. 108128281, dated Apr. 20, 2020, 6 pages (with English translation).
(Continued)

*Primary Examiner* — Michelle T Bechtold
(74) *Attorney, Agent, or Firm* — Fish & Richardson P.C.

(57) ABSTRACT

Methods, systems, and apparatus, including an apparatus for transferring data using multiple buffers, including multiple memories and one or more processing units configured to determine buffer memory addresses for a sequence of data elements stored in a first data storage location that are being transferred to a second data storage location. For each group of one or more of the data elements in the sequence, a value of a buffer assignment element that can be switched between multiple values each corresponding to a different one of the memories is identified. A buffer memory address for the group of one or more data elements is determined based on the value of the buffer assignment element. The value of the buffer assignment element is switched prior to determining the buffer memory address for a subsequent group of one or more data elements of the sequence of data elements.

14 Claims, 3 Drawing Sheets

Related U.S. Application Data continuation of application No. 15/641,824, filed on Jul. 5, 2017, now Pat. No. 10,175,912.

(51) Int. Cl.
*G06N 3/08* (2006.01)
*G06F 12/02* (2006.01)
*G06F 5/08* (2006.01)
G06F 9/30 (2018.01)
G06N 3/063 (2006.01)

(52) U.S. Cl.
CPC ...... *G06F 12/0207* (2013.01); *G06F 12/0215* (2013.01); *G06N 3/04* (2013.01); *G06N 3/08* (2013.01); *G06F 9/30112* (2013.01); *G06F 2212/1016* (2013.01); *G06F 2212/302* (2013.01); *G06N 3/063* (2013.01)

(56) References Cited

U.S. PATENT DOCUMENTS

| | | | |
|---|---|---|---|
| 6,321,310 B1 * | 11/2001 | McCarthy | G06F 13/28 710/20 |
| 6,332,186 B1 | 12/2001 | Elwood | |
| 6,363,470 B1 | 3/2002 | Laurenti et al. | |
| 6,931,497 B2 | 8/2005 | Clayton et al. | |
| 7,155,570 B1 | 12/2006 | Sningh et al. | |
| 7,330,918 B2 | 2/2008 | Yamamoto et al. | |
| 7,492,778 B2 | 2/2009 | Gresham | |
| 7,864,864 B2 | 1/2011 | Mehta et al. | |
| 10,496,326 B2 | 12/2019 | Temam et al. | |
| 2010/0281192 A1 | 11/2010 | Rakib et al. | |
| 2011/0219150 A1 | 9/2011 | Piccirillo et al. | |
| 2013/0238821 A1 | 9/2013 | Day | |
| 2017/0220352 A1 | 8/2017 | Woo et al. | |
| 2019/0138243 A1 | 5/2019 | Temam et al. | |

OTHER PUBLICATIONS

PCT International Search Report and Written Opinion issued in International Application No. PCT/US2018/0380009, dated Oct. 2, 2018, 14 pages.

Wei et al. "Automated systolic array architecture synthesis for high throughput CNN inference on FPGAs," ACM/EDAC/IEEE Design Automation Conference Jun. 18, 2017, 6 pages.

TW Office action issued in Taiwanese Application No. 107123234, dated Feb. 25, 2019, 14 pages (with English translation).

EP Extended Search Report in European Application No. 20162095.2, dated Jun. 23, 2020, 9 pages.

EP Office Action in European Application No. 20162095.2, dated Oct. 26, 2020, 8 pages.

JP Office Action in Japanese Application No. 2019-530793, dated Nov. 4, 2020, 14 pages (with English translation).

KR Office Action in Korean Application No. 10-2019-7015789, dated Mar. 17, 2021, 22 pages (with English translation).

IN Office Action in Indian Application No. 201947021094, dated Apr. 28, 2021, 6 pages (with English translation).

* cited by examiner

HARDWARE DOUBLE BUFFERING USING A SPECIAL PURPOSE COMPUTATIONAL UNIT

CROSS-REFERENCE TO RELATED APPLICATIONS

This application is a continuation application of, and claims priority to, U.S. patent application Ser. No. 16/240,459, now U.S. Pat. No. 10,496,326, titled "HARDWARE DOUBLE BUFFERING USING A SPECIAL PURPOSE COMPUTATIONAL UNIT," filed on Jan. 4, 2019, which application is a continuation application of, and claims priority to, U.S. patent application Ser. No. 15/641,824, now U.S. Pat. No. 10,175,912, titled "HARDWARE DOUBLE BUFFERING USING A SPECIAL PURPOSE COMPUTATIONAL UNIT," filed on Jul. 5, 2017. The disclosure of the foregoing applications are incorporated herein by reference in their entirety for all purposes.

BACKGROUND

This specification generally relates to performing machine learning computations using a special purpose computational unit with hardware double buffers.

Neural networks are machine learning models that employ one or more layers of models to generate an output, e.g., a classification, for a received input. Some neural networks include one or more hidden layers in addition to an outer layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Kernels can be represented as a matrix structure of weight inputs. Each convolutional layer uses the kernels to process inputs to the layer. A set of inputs to the layer can also be represented as a matrix structure.

SUMMARY

This specification describes technologies relating to using a special purpose computational unit for double buffering data of an N-dimensional tensor.

In general, one innovative aspect of the subject matter described in this specification can be embodied in an apparatus for transferring data. The apparatus can include multiple memories including at least a first memory and a second memory. The apparatus can also include one or more processing units. The one or more processing units can be configured to determine buffer memory addresses for a sequence of data elements stored in a first data storage location that are being transferred to a second data storage location. For each group of one or more of the data elements in the sequence, the one or more processing units can identify a value of a buffer assignment element that can be switched between multiple values each corresponding to a different one of the memories. The one or more processing units can determine a buffer memory address for the group of one or more data elements based on the value of the buffer assignment element. When the value of the buffer assignment element is a first value corresponding to the first memory, the one or more processing units can assign the group of one or more data elements to the first memory by determining the buffer memory address for the group of one or more data elements based on a combination of a base address for the first memory and a memory offset value for the group of one or more data elements. When the value of the buffer assignment element is a second value different from the first value and corresponding to the second memory, the one or more processing units can assign the data element to the second memory by determining the memory address for the group of one or more data elements based on a combination of the base address for the first memory, the memory address offset value for the second memory and the memory offset value for the group of one or more data elements to assign the group of one or more data elements to the second memory. The one or more processing units can switch the value of the buffer assignment element prior to determining the buffer memory address for a subsequent group of one or more data elements of the sequence of data elements. The one or more processing units can transfer each data element to a respective memory location of the first or second memory using the determined buffer memory address for each group of one or more data elements.

These and other implementations can each optionally include one or more of the following features. In some aspects, the first memory and the second memory are buffers that each have a first data storage capacity. The first data storage location and the second data storage location can each include at least a second data storage capacity that is greater than the first data storage capacity.

In some aspects, the first memory and the second memory are buffers that each have a first data storage capacity. The sequence of data elements can include an amount of data that exceeds the first data storage capacity.

In some aspects, determining the buffer memory address for the group of one or more data elements based on the value of the buffer assignment element and a memory address offset value for the second memory can include determining the memory offset value for the group of one or more data elements based on a number of iterations of one or more loops used to iterate through the sequence of data elements.

In some aspects, determining the buffer memory address for the group of one or more data elements based on the value of the buffer assignment element and a memory address offset value for the second memory can include, whenever the value of the buffer assignment element is the second value, determining, as the buffer memory address for the group of one or more data elements, a sum of (i) the base address for the first memory, (ii) the memory address offset value for the second memory and (iii) the memory offset value for the group of one or more data elements. Whenever the value of the buffer assignment element is the first value, the buffer memory address for the group of one or more data elements can be determined based on a sum of (i) the base address for the first memory and (ii) the offset value for the group of one or more data elements independent of the memory address value for the second memory.

In some aspects, the memory offset value for the group of one or more data elements is based on a number of iterations of a loop for each dimension of the N-dimensional tensor. The memory address offset value for the second memory can be based on a difference between a memory address of the first memory address of the second memory.

The subject matter described in this specification can be implemented in particular embodiments so as to realize one or more of the following advantages. Using multiple memories allows for quicker and more efficient transfer of data that exceeds the storage capacity of a single buffer. For example, if 8 megabytes (MBs) of data is to be transferred from a first data storage location to a second data storage location and the capacity of a buffer is only 4 MBs, the data can be split between two 4 MB buffers. By using nested loops to determine memory addresses for multiple buffers, the number of instructions for determining the addresses can be reduced, resulting in denser encoding, fewer memory resources used, and/or fewer required memory resources. Using a buffer assignment element (e.g., a one-bit toggle counter) that is switched between values after each buffer memory address determination allows for quicker buffer assignment and reduced instruction count to assign data to multiple buffers. In addition, switching the value of the buffer assignment element rather than determining whether a first buffer is full before assigning data to a second buffer allows for quicker processing and less computational demand placed on a processor. The reduction in instructions also results in higher performance as the processing unit processes fewer instructions to determine the memory addresses. Encoding a double buffer instruction in a special purpose hardware unit reduces the number of computational cycles a processor would otherwise perform to assign data to buffers and therefore increases processor bandwidth for other computation tasks.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
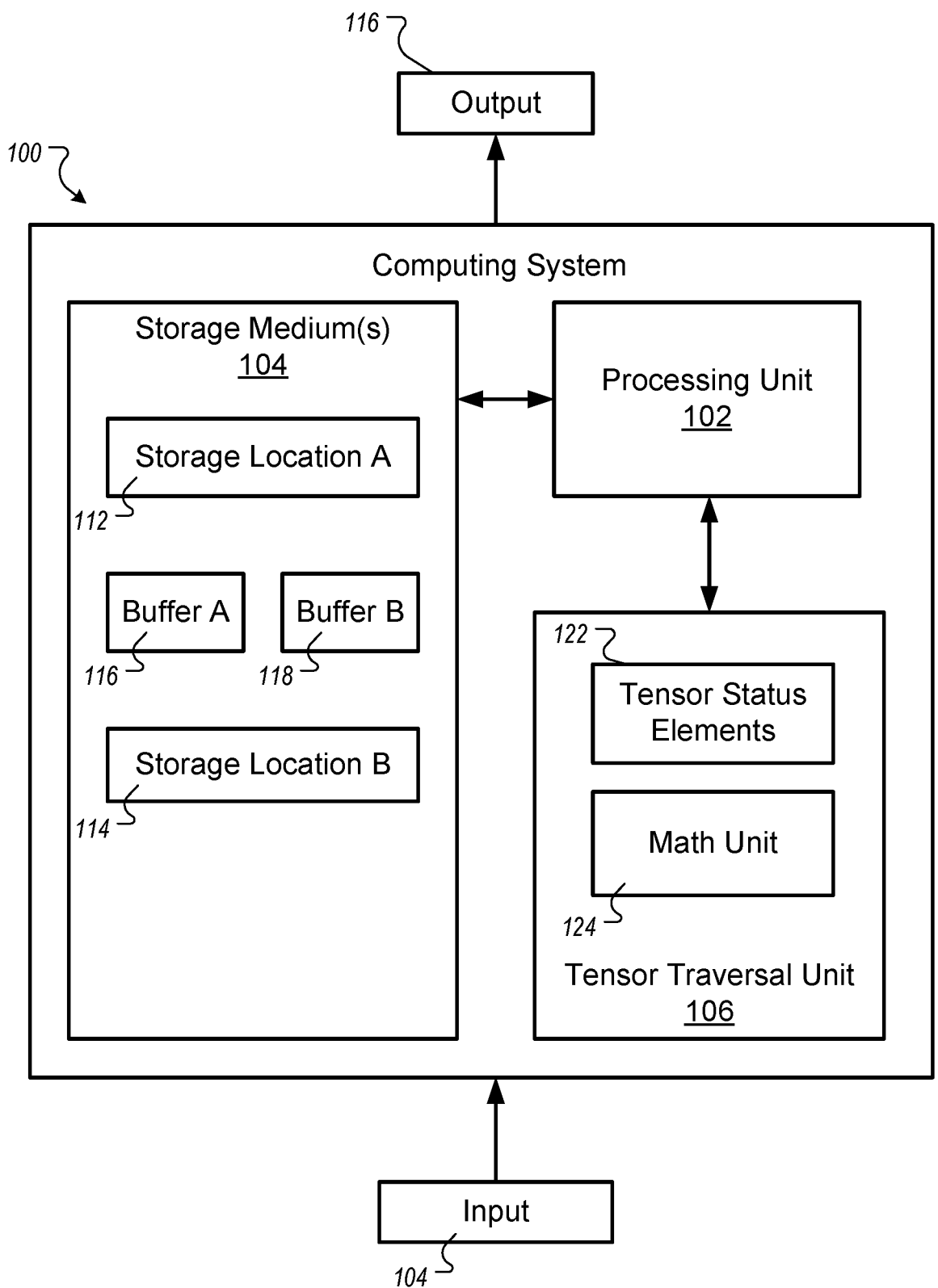
FIG. 1 is a block diagram of an example computation system.

In general, when a software algorithm processes an N-dimensional tensor, a nested loop may be used. Each loop can be responsible for traversing a respective dimension of the N-dimensional tensor. A multi-dimensional tensor may be a matrix or a multi-dimensional matrix. For example, a 2-dimensional tensor is a matrix, while a 3-dimensional tensor is a three-dimensional matrix made up of multiple two-dimensional matrices. Each dimension of the N-dimensional tensor may include one or more elements, where each element may store a respective data value. For example, a tensor may be a variable in a program, where the variable may have three dimensions. The first dimension may have a length of three hundred elements, the second dimension may have a length of a thousand elements, and the third dimension may have a length of twenty elements. Of course, other numbers of elements in each dimension are possible.

Traversing the tensor in a nested loop can include a computation of a memory address value of an element to load or store the corresponding data value of the element. A for-loop is an example of a nested loop, where three loops tracked by three loop index variables (e.g., i, j, and k) can be nested to traverse through a three-dimensional tensor. In a neural network, a value of an element may be used in one or more dot product computations associated with the tensor. For example, the value of the element may be multiplied with a corresponding parameter or weight. The elements of the tensor may be traversed in order using nested for-loops to access the element and perform one or more computations using the value of the element. Continuing the three dimensional tensor example, an outer for-loop may be used to traverse the loop tracked by variable i, a middle for-loop loop may be used to traverse the loop tracked by variable j, and an inner for-loop may be used to traverse the loop tracked by variable k. In this example, the first element accessed may be (i=0, j=0, k=0), the second element may be (i=0, j=0, k=1), and so on.

As described below, a tensor traversal unit can be used to determine the memory address for each element in order using nested loops so that a processing unit can access the value of the element and perform the one or more computations using the value of the element. The values of weights or parameters can also be accessed similarly using nested for-loops. The tensor traversal unit can also be used to determine the addresses for weights or parameters used in the computations and/or for the outputs of the computations, which may be used as inputs to a hidden layer of the neural network.

Techniques described herein allow for loop nests to be encoded to produce and consume data using double buffering. For example, data stored in tensor elements may be transferred from one data storage location to another data storage location using double buffering techniques. In a neural network example, activations determined as an output of one hidden layer may be provided as inputs to another hidden layer and thus may be transferred from an output location, i.e., a memory location where outputs of neural network layers are stored, to an input location, i.e., a memory location where inputs to neural network layers are stored. In another example, data representing the output of a calculation may be transferred from a temporary memory location to a more permanent memory location. In each of these examples, the data may be transferred more quickly and the data can be ready for subsequent processing more quickly using double buffering.

Buffering can be used to collect data for a neural network computation prior to the computation being performed. For example, inputs to a neural network layer may be stored in a particular location for retrieval by a processor that performs the computations. While data stored in the particular location are being used to perform neural network computations, data for the next machine learning computation can be moved into the buffers. When the previous neural network computation has been completed, the data stored in the buffers can be moved to the particular location for retrieval by the processor.

One or more loops in a loop nest may be used to compute buffer memory addresses for tensor elements for which the data is being produced or consumed using the double buffers. Multiple buffers may be used when the amount of data to be transferred is greater than the storage capacity of a single buffer. For example, if the amount of data being transferred is twice the storage capacity of a single buffer, the data may be split between two buffers. In this example, a first portion of the data may be transferred to a first buffer and a second portion of the data may be transferred to a second buffer before being transferred to the second data storage location. In this way, all of the data can be buffered prior to being transferred to the second data storage location.

As an example, elements of a three dimensional tensor may represent the features of an image being classified by a neural network. A first dimension (Z) may represent the width of the image, the second dimension (Y) may represent the height of the image, and the third dimension (X) may represent RGB values for pixels in the image. To classify the image, each RGB value may be multiplied by a filter value of a convolutional layer to generate an activation map.

A nested loop can be used to determine the memory address for accessing each RGB value of the tensor. The nested loop can include a loop for each dimension of the tensor. For example, an outer loop (z) may be used to traverse the Z dimension (the width of the image), a middle loop (y) may be used to traverse the Y dimension (the height of the image), and an inner loop (x) may be used to traverse the X dimension (the three RGB values for each pixel). At each iteration of the inner loop, a memory address is determined for one of the three RGB values for a particular pixel of the image represented by the value of the outer loop z and the middle loop y. For example, the memory address for the R value of the pixel of the image represented by Z=0 and Y=0, may be determined during the first iteration of the inner loop x when z=0 and y=0 (e.g., z=0; y=0; x=0). Similarly, the memory address for the G value of the pixel of the image represented by Z=5 and Y=2 may be determined during the third iteration of the inner loop x when z=5 and y=2 (e.g., z=5; y=2; x=2). If the three RGB values for each pixel of the image exceed the capacity of a buffer, the data representing the three RGB values for each pixel of the image can be split between two or more buffers.

To determine the buffer memory addresses for multiple buffers using nested loops, a value of a buffer assignment element can be switched after (or before) each iteration of a loop used to determine the buffer memory addresses. For example, if two buffers are used and the data is being split between the two buffers, the buffer assignment value may be switched between two values. A first value (e.g., 0) of the buffer assignment element may be used to assign a data element (or a group of data elements) to a first buffer and a second value (e.g., 1) of the buffer assignment element may be used to assign a data element (or a group of data elements) to the second buffer. When the value of the buffer assignment element is the first value for an iteration of the loop, the data element corresponding to this iteration of the loop may be assigned to a buffer memory address of the first buffer. Similarly, when the value of the buffer assignment element is the second value for an iteration of the loop, the data element corresponding to this iteration of the loop may be assigned to a buffer memory address of the second buffer. If three or more buffers are used, the buffer assignment element may have three or more values, e.g., a value for each buffer.

FIG. 1 is a block diagram of an example computation system 100. In general, the computing system 100 processes an input 104 to generate an output 116. The computing system 100 may be configured to perform linear algebra computations, neural network computations, and other computations. The input 104 may be any suitable data that can be processed by the computing system 100. The computing system 100 includes a processing unit 102, one or more storage mediums 104, and a tensor traversal unit 106.

The processing unit 114 can include one or more processors and/or one or more finite-state machines (FSM). A processor of the processing unit 114 can execute an instruction for accessing a particular element of a tensor. When the processor processes such an instruction, the tensor traversal unit 106 determines the memory address of the particular element of the tensor, such that the processing unit may access the storage medium(s) 104 to read data representing the value of the particular element.

For processing units that include a FSM, the FSM can query memory addresses for tensor elements from the tensor traversal unit 106. In some implementations, the FSM 108 continuously queries the tensor traversal unit 106 for address values for particular elements of the tensor. The FSM can then provide the received address values to a processor of the processing unit 102 so that the processor can access the storage medium(s) 104 to read data representing the value of the particular element.

For example, a program may include a nested loop and the processing unit 102 may execute an instruction to access an element of a two-dimensional array variable within the nested loop according to current index variable values associated with the nested loop. Based on the current index variable values associated with the nested loop, the tensor traversal unit 106 may determine an address offset value that represents an offset from a memory address for a first element of the two-dimensional array variable. The processing unit 102 may then access, using the address offset value and from the storage medium 104, the particular element of the two-dimensional array variable.

The storage medium 104 stores information within the computing system 100. In some implementations, the storage medium 104 is a volatile memory unit or units. In some other implementations, the storage medium 104 is a non-volatile memory unit or units. The storage medium 104 may also be another form of computer-readable medium, such as a floppy disk device, a hard disk device, an optical disk device, or a tape device, a flash memory or other similar solid state memory device, or an array of devices, including devices in a storage area network or other configurations. The instructions, when executed by the processing unit 102, cause the processing unit 102 to perform one or more tasks.

In general, the tensor traversal unit 106 determines a status associated with one or more tensors. In some implementations, the status may include loop bound values, current loop index variable values, partial address offset values for determining a memory address value, and/or program counter values for handling branch loop bounds. The tensor traversal unit 106 may be implemented as an application-specific integrated circuit.

The tensor traversal unit 106 can translate tensor indices into memory addresses. For example, the tensor traversal unit 106 may translate a set of N-dimensional tensor indices into a one-dimensional address space. The tensor traversal unit 106 can perform such translations by making a tensor element's memory address a combination (e.g., a linear combination) of the element's dimension indices.

The tensor traversal unit 106 can include one or more tensor status elements 122 and a math unit 124. Each of the tensor status elements 122 may be a storage element, for example, a register or any suitable storage circuitry. The tensor status elements 122 can include a buffer assignment element described below. The math unit 124 can include one or more arithmetic logic units (ALUs) and/or one or more hardware adders. The math unit 124 can be used to compute a memory address or memory address offset value for tensor elements, e.g., based on values stored in the tensor status elements. Example techniques for determining memory addresses using a tensor traversal unit are described in U.S. patent application Ser. No. 15/335,769 titled "Neural Network Compute Tile" and filed on Oct. 27, 2016 and U.S. patent application Ser. No. 15/014,265 titled "Accessing Data in Multi-Dimensional Tensors" and filed on Feb. 3, 2016, the entire contents of which are incorporated herein by reference.

The tensor traversal unit 106 can also be configured to determine memory addresses for temporary memory locations, e.g., buffers, for transferring data from one data storage location to another data storage location. For example, the storage medium(s) 104 can include multiple data storage locations, including storage location A 112 and storage location B 114. Each storage location may be a range of memory addresses of a common memory unit or different memory units. The storage medium(s) 104 can also include multiple temporary memories, including buffer A 116 and buffer B 118. The processing unit 102 can transfer data from a first data storage location (e.g., storage location A 112) to one or more buffers (e.g., buffer A 116 and/or buffer B 118) before transferring the data to a second data storage location (e.g., storage location B 114).

The tensor traversal unit 106 can determine buffer memory addresses for tensor elements for which the data is being produced or consumed using the buffer (e.g., double buffers). For example, the tensor traversal unit 106 can translate tensor indices into buffer memory addresses using a base buffer memory address for the tensor and an address offset for each tensor element that is based on the tensor indices for the tensor element, similar to the technique described in U.S. patent application Ser. No. 15/014,265 titled "Accessing Data in Multi-Dimensional Tensors" and filed on Feb. 3, 2016.

When two or more buffers are used to transfer data, the tensor traversal unit 106 can also use a buffer assignment element to assign each tensor element or group of tensor elements to one of the buffers. In some implementations, the tensor traversal unit 106 can assign a group of one or more tensor elements to one of the buffers by adding an additional offset to the buffer memory address when the value of the buffer assignment element is one value and assign a group of one or more tensor elements to a different buffer when the buffer assignment element is a different value by not adding the additional offset value to the buffer memory address.

For example, a base memory address may correspond to the first memory address of a first buffer. The first memory address of a second buffer may be offset by a particular number of addresses from the base memory address. In this example, to assign a tensor element to a memory address of the first buffer, the tensor traversal unit 106 may combine (e.g., add) the base memory address with a memory offset value for the tensor element. The memory offset value for the tensor element may be determined based on the tensor indices of nested loops used to traverse the tensor, as described in U.S. patent application Ser. No. 15/014,265 titled "Accessing Data in Multi-Dimensional Tensors" and filed on Feb. 3, 2016.

To assign a tensor element to a memory address of the second buffer, the tensor traversal unit 106 may combine (e.g., add) the base memory address with a memory offset value for the tensor element and a memory address offset value for the second buffer (e.g., the particular number of addresses from which the first memory address of the second buffer is offset from the first memory address of the first buffer).

The tensor traversal unit 106 can use the value of the buffer assignment element to determine when to assign a tensor element to the second buffer and therefore determine the buffer memory address for the tensor element by combining the memory address offset value for the second buffer with the base memory address and the memory offset value for the tensor element. For example, when the value of the buffer assignment element is a first value, the tensor traversal unit 106 can assign the tensor element to the first buffer by not combining the memory address offset value with the base memory address and the memory offset value for the tensor element. When the value of the buffer assignment element is a second value different from the first value, the tensor traversal unit 106 can assign the tensor element to the second buffer by combining the memory address offset value with the base memory address and the memory offset value for the tensor element.

In some implementations, the tensor traversal unit 106 may determine the buffer memory addresses for a sequence of tensor elements in a sequence, e.g., using nested loops. In this example, the processing unit 102 can request, from the tensor traversal unit 106, a buffer memory address for a group of one or more tensor elements for each iteration of a particular loop, e.g., each iteration of an inner most loop. The tensor traversal unit 106 can determine the memory offset value for a group of tensor elements corresponding to the iteration of the loop based on the loop indices. The tensor traversal unit 106 can also determine whether to assign the group of tensor elements to the first buffer or the second buffer (or additional buffers if more than two) based on the value of the buffer assignment element, as described above. The tensor traversal unit 106 can determine the buffer memory address for the group of tensor elements based on the base memory address, the memory offset value for the group of tensor elements, and, depending on the value of the buffer assignment element, the memory offset value for the second buffer.

After determining the buffer memory address for a group of tensor elements in the sequence, the tensor traversal unit can switch the value of the buffer assignment element. For example, if there are two buffers, the tensor traversal unit 106 may toggle the value between two values after each buffer memory address determination. In this example, the tensor traversal unit 106 can assign a group of tensor elements to the first buffer when the value of the buffer assignment element is zero and assign a group of tensor elements to the second buffer when the value of the buffer assignment element is one. For a first buffer memory address determination, the buffer assignment element may have a value of zero. In this example, the tensor traversal unit 106 can assign the first group of tensor elements in the sequence to the first buffer. The tensor traversal unit 106 can then switch the value of the buffer assignment element to one. Thus, the tensor traversal unit 106 can assign the second group of tensor elements in the sequence to the second buffer. The tensor traversal unit 106 can continue switching the value after each buffer memory address determination such that every other group of tensor elements is assigned to the first buffer.

In some implementations, coarse-grained toggling is used such that a group of tensor elements (e.g., a subtensor of the tensor) is assigned to a buffer for each buffer memory address determination. In some implementations, fine-grained toggling is used such that each individual tensor element is assigned to a buffer at each memory address determination.

Consider an example in which the tensor traversal unit has two 1 kilobyte (kB) buffers and 4 kB of data is to be transferred using the buffers. An example loop nest can include an outer loop that alternates between the two buffers and an inner loop can be used identify each portion of data to include in the current buffer. For example, the nested loop can include:

for (i=0; i<4, ++i)
for (j=0; j=1024; ++j)

In this example, the inner loop "j" is used to identify 1 kB of data to include in a buffer and outer loop "i" is used to switch between the two buffers. For example, when "i" has an odd value, the 1 kB group of data elements may be assigned to the first buffer. When "i" has an even value, the 1 kB of data may be assigned to the second buffer. Thus, in this example, the loop nest alternates between the two buffers based on the value of "i".

If there are more than two buffers, the tensor traversal unit 106 may switch the buffer assignment elements between more than two different values, e.g., a unique value for each buffer. For example, if there are three buffers, the tensor traversal unit 106 can assign a group of tensor elements to the first buffer when the buffer assignment element has a first value; the tensor traversal unit 106 can assign a group of tensor elements to the second buffer when the buffer assignment element has a second value; and the tensor traversal unit 106 can assign a group of tensor elements to the third buffer when the buffer assignment element has a third value.

In another example, there may be two buffers each having a storage capacity of 1 MB and 3 MB of data may need to be transferred through the buffers. In this example, the first 1 MB can be assigned to a first of the two buffers and a second 1 MB can be assigned to a second of the two buffers. Then, after the first 1 MB is consumed, e.g., by a processor, the third 1 MB can be moved to the first buffer.

In some implementations, the tensor traversal unit 106 can obtain a sequence of alternating buffer assignment values rather than switch the value of a buffer assignment element after each buffer memory address determination. For example, the sequence of alternating buffer assignment values may be a sequence of alternating zeros and ones. After each memory address determination, the tensor traversal unit 106 can move to the next value in the sequence and assign the group of tensor elements to an appropriate buffer based on the next value.

Figure 2:
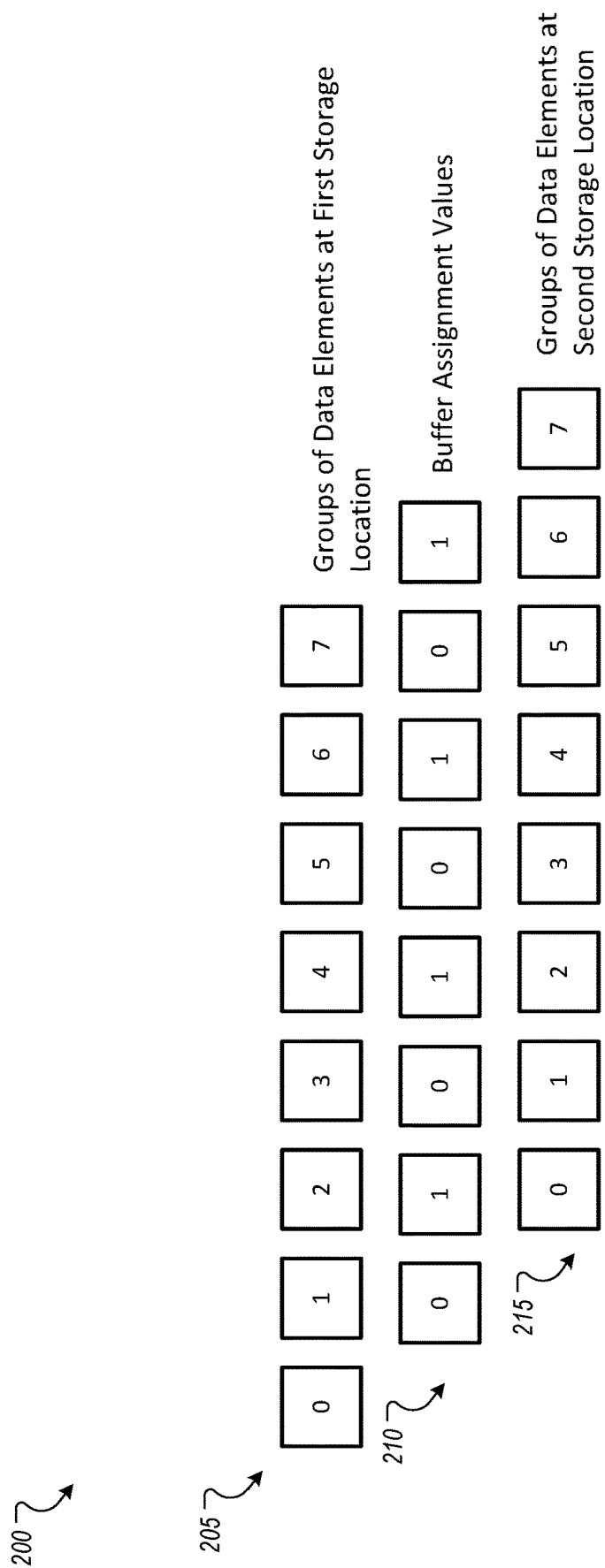
FIG. 2 illustrates example data being transferred using buffers and example buffer assignment elements.

FIG. 2 illustrates example data being transferred using buffers and example buffer assignment elements. In this example, a sequence of eight groups of data elements, e.g., tensor elements, are being transferred from a first data storage location 205 to a second data storage location 215 using two buffers. A sequence of buffer assignment values 210 are used to assign each group of data elements to one of the two buffers. For example, if the group of data elements is at a same position in its sequence as a buffer assignment element having a value of zero, the group of data elements is assigned to a first buffer. If the group of data elements is at a same position in its sequence as a buffer assignment element having a value of one, the group of data elements is assigned to a second buffer different from the first buffer.

Thus, in this example, data element groups "0", "2", "4", and "6" are assigned to the first buffer as the first, third, fifth, and seventh buffer assignment values are zero. Similarly, data element groups "1", "3", "5", and "7" are assigned to the second buffer as the second, fourth, sixth, and eighth buffer assignment values are one. Thus, two buffers that each have a storage capacity to store four groups of data elements can be used to buffer the eight groups of data elements.

Figure 3:
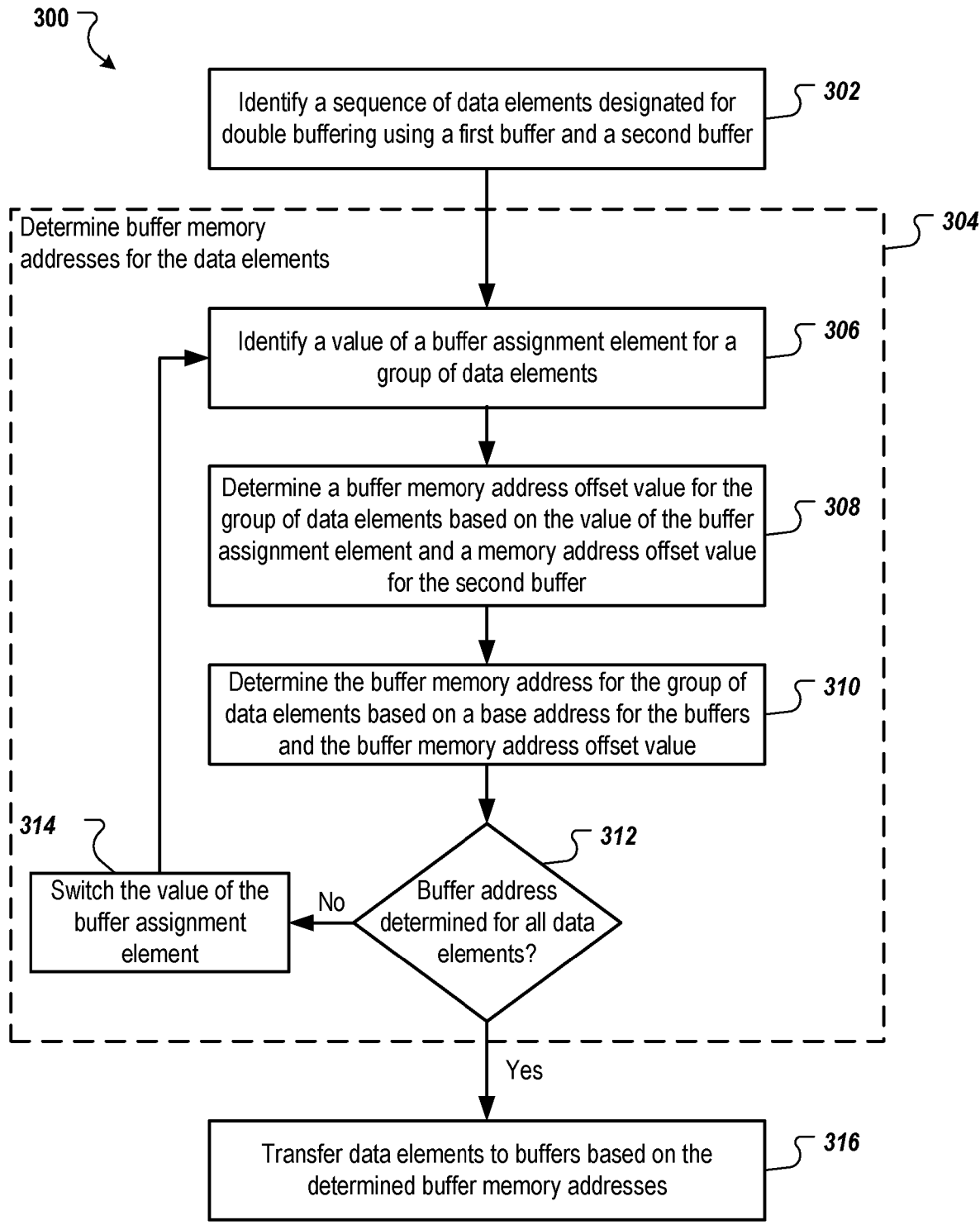
FIG. 3 is a flow diagram that illustrates an example process for transferring data using double buffering.

FIG. 3 is a flow diagram that illustrates an example process 300 for transferring data using double buffering. The process 300 may be performed by a system of one or more computers, e.g., the computing system 110 of FIG. 1.

The system identifies a sequence of data elements designated for double buffering using a first buffer and a second buffer (302). The sequence of data elements may be a sequence of tensor elements that are designated for double buffering. The tensor elements may be a part of an N-dimensional tensor. For example, a tensor may be traversed using nested loops where each loop is responsible for traversing a respective dimension of the N-dimensional tensor.

The sequence of data elements may include all of the tensor elements of a particular dimension that has been designated for double buffering. For example, a program that includes the nested loops may include code designating the loop corresponding to the particular dimension as a loop that is to be double buffered. In a particular three dimensional tensor example, the tensor may be traversed using three loops with indices x, y, and z. In this example, a Z dimension of the tensor may be traversed using an outer loop with index z, a Y dimension of the tensor may be traversed using a middle loop with index y, and an X dimension of the tensor may be traversed using an inner loop index x. The inner loop may be designated for double buffering to quickly buffer data for a neural network computation.

The system determines a buffer memory address for each group of data elements in the sequence (304). Each group can include one or more data elements. For example, if fine-grained toggling is used, each group can include one data element. If coarse-grained toggling is used, each group can include multiple data elements, e.g., up to a specified amount of memory or specified number of data elements.

In some implementations, the system determines the buffer memory addresses one at a time. Continuing the previous example, the system may determine a buffer memory address for each iteration of the inner loop x as each iteration of the inner loop corresponds to a particular tensor element designated for double buffering. The system may determine the buffer memory addresses for the sequence of data elements using constituent operations 306-314.

The system identifies a value of a buffer assignment element for a group of data elements in the sequence of data elements (306). In some implementations, as described above, the system can switch the value of the buffer assignment element after each buffer memory address determination, e.g., after each iteration of a loop designated for double buffering. In this example, the system can identify a current value of the buffer assignment element as the value of the buffer assignment element for this data element. The value of the buffer assignment element is used to assign the group of data elements to an appropriate buffer.

The system determines a buffer memory address offset value for the group of data elements based on the value of the buffer assignment element and a memory address offset value for the second buffer (308). As described above, a base memory address for the buffers may correspond to the first memory address of a first buffer. The first memory address of a second buffer may be offset by a particular number of addresses from the base memory address. The memory address offset value for the second buffer may be equal to the particular number of addresses.

To determine the buffer memory address offset value for the group of data elements, the system determines whether the value of the buffer assignment element is a first value or a second value (or more values if there are more than two buffers). If the buffer assignment element is the first value, the system can assign the group of data elements to the first buffer by not using the memory address offset value for the second buffer when determining the buffer memory address value for the group of data elements. Instead, the system can use a memory offset value for the data element that is determined based on loop indices of the nested loops, as described above.

If the buffer assignment element is the second value, the system can assign the group of data elements to the second buffer by combining the memory offset value for the group of data elements with the memory address offset value for the second buffer. For example, the system may determine, as the buffer memory address offset value for the group of data elements, a sum of the memory offset value for the group of data elements and the memory address offset value for the second buffer.

In some implementations, the system can compute the buffer memory address offset value for a group of data elements by ANDing the value of the buffer assignment element with a value of one and multiplying the result by the memory address offset value for the second buffer, and adding this result to the memory offset value for the group of data elements. In this example, if the buffer assignment element has a value of zero, the buffer memory address offset value for the group of data elements is equal to the memory offset value for the group of data elements. If the buffer assignment element has a value of one, the buffer memory address offset value for the group of data elements has a value equal to the memory address offset value for the second buffer plus the memory offset value for the group of data elements. In some implementations, a one-bit toggle counter can be used to determine which buffer to use.

The system determines the buffer memory address for the group of data elements based on a base address for the buffers and the buffer memory address offset value (310). For example, the system can determine the buffer memory address for the group of data elements by adding the base address for the buffers (e.g., the first memory address for the first buffer) to the buffer memory address offset value.

The system determines whether a buffer memory address has been determined for each data element in the sequence (312). If not, the system switches the value of the buffer assignment element for the next data element. In this way, the next data element will be assigned to a different buffer than the current data element.

If a buffer memory address has been determined for each data element in the sequence, the system transfers the data stored in the data elements to buffers based on the determined buffer memory addresses (314). The data may then be transferred from the buffers to a second data storage location, e.g., for use in neural network computations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system, comprising:
  a plurality of memories;
  a first data storage and a second data storage; and
  processing circuitry arranged to:
    determine buffer memory addresses for data of an N-dimensional tensor stored in the first data storage that is being transferred to the second data storage, wherein N is an integer that is equal to or greater than two, the determining comprising:
      selecting a plurality of data elements of the N-dimensional tensor using an inner loop of a loop nest, including identifying, as the plurality of data elements, portions of data of the N-dimensional tensor until a loop bound for the inner loop is reached;
      for the plurality of data elements of the N-dimensional tensor:
        identifying a current value of a buffer assignment element, wherein each value of the buffer assignment element corresponds to a respective memory of the plurality of memories, and wherein the value of the buffer assignment element is updated each time buffer memory addresses are determined for a data element;
        selecting, based on the current value of the buffer assignment element, a memory address offset value corresponding to the current value of the buffer assignment element;
        determining the buffer memory address for each data element of the plurality of data elements based at least on a combination of (i) a base address for the plurality of memories, (ii) the memory address offset value corresponding to the current value of the buffer assignment element, and (iii) a memory offset value for the data element; and
        outputting the determined buffer memory addresses; and
        updating, using an outer loop of the loop nest, the value of the buffer assignment element each time the loop bound of the inner loop is reached.

2. The system of claim 1, wherein outputting the determined buffer memory addresses comprises outputting the determined buffer memory addresses to a processing unit that transfers the plurality of data elements to the respective memory corresponding to the current value of the buffer assignment element using the determined buffer memory addresses, wherein the processing unit comprises at least one of a processor or a finite state machine.

3. The system of claim 1, wherein the loop bound for the inner loop corresponds to a maximum data size of each respective memory.

4. The system of claim 1, wherein the value of the buffer assignment element is based on a current index value of the outer loop.

5. The system of claim 1, wherein the memory offset value for each data element is based on current index values of multiple loops in an additional loop nest used to traverse the N-dimensional tensor.

6. A method performed by a computing system for transferring data, the method comprising:
  selecting a plurality of data elements of an N-dimensional tensor using an inner loop of a loop nest, including identifying, as the plurality of data elements, portions of data of the N-dimensional tensor until a loop bound for the inner loop is reached;
  for the plurality of data elements of the N-dimensional tensor:
    identifying a current value of a buffer assignment element, wherein each value of the buffer assignment element corresponds to a respective memory of a plurality of memories, and wherein the value of the buffer assignment element is updated each time buffer memory addresses are determined for a data element;
    selecting, based on the current value of the buffer assignment element, a memory address offset value corresponding to the current value of the buffer assignment element;
    determining a buffer memory address for each data element of the plurality of data elements based at least on a combination of (i) a base address for the plurality of memories, (ii) the memory address offset value corresponding to the current value of the buffer assignment element, and (iii) a memory offset value for the data element;
    outputting the determined buffer memory addresses; and
    updating, using an outer loop of the loop nest, the value of the buffer assignment element each time the loop bound for the inner loop is reached.

7. The method of claim 6, wherein outputting the determined buffer memory addresses comprises outputting the determined buffer memory addresses to a processing unit that transfers the plurality of data elements to the respective memory corresponding to the current value of the buffer assignment element using the determined buffer memory addresses, wherein the processing unit comprises at least one of a processor or a finite state machine.

8. The method of claim 6, wherein the loop bound for the inner loop corresponds to a maximum data size of each respective memory.

9. The method of claim 6, wherein the value of the buffer assignment element is based on a current index value of the outer loop.

10. The method of claim 6, wherein the memory offset value for each data element is based on current index values of multiple loops in an additional loop nest used to traverse the N-dimensional tensor.

11. An apparatus, comprising:
  a plurality of memories; and
  processing circuitry arranged to:
    determine buffer memory addresses for data of an N-dimensional tensor stored in a first data storage location that is being transferred to a second data storage location, wherein N is an integer that is equal to or greater than two, the determining comprising:

selecting a plurality of data elements of the N-dimensional tensor using an inner loop of a loop nest, including identifying, as the plurality of data elements, portions of data of the N-dimensional tensor until a loop bound for the inner loop is reached;

for the plurality of data elements of the N-dimensional tensor:

identifying a current value of a buffer assignment element, wherein each value of the buffer assignment element corresponds to a respective memory of the plurality of memories, and wherein the value of the buffer assignment element is updated each time buffer memory addresses are determined for a data element;

selecting, based on the current value of the buffer assignment element, a memory address offset value corresponding to the current value of the buffer assignment element;

determining the buffer memory address for each data element of the plurality of data elements based at least on a combination of (i) a base address for the plurality of memories, (ii) the memory address offset value corresponding to the current value of the buffer assignment element, and (iii) a memory offset value for the data element;

outputting the determined buffer memory addresses; and updating, using an outer loop of the loop nest, the value of the buffer assignment element each time the loop bound of the inner loop is reached.

12. The apparatus of claim 11, wherein outputting the determined buffer memory addresses comprises outputting the determined buffer memory addresses to a processing unit that transfers the plurality of data elements to the respective memory corresponding to the current value of the buffer assignment element using the determined buffer memory addresses, wherein the processing unit comprises at least one of a processor or a finite state machine.

13. The apparatus of claim 11, wherein the loop bound for the inner loop corresponds to a maximum data size of each respective memory.

14. The apparatus of claim 11, wherein the value of the buffer assignment element is based on a current index value of the outer loop.

* * * * *